No. 894,106. PATENTED JULY 21, 1908.
S. M. BEEL.
EGG BREAKER.
APPLICATION FILED JULY 10, 1907.
2 SHEETS—SHEET 1.
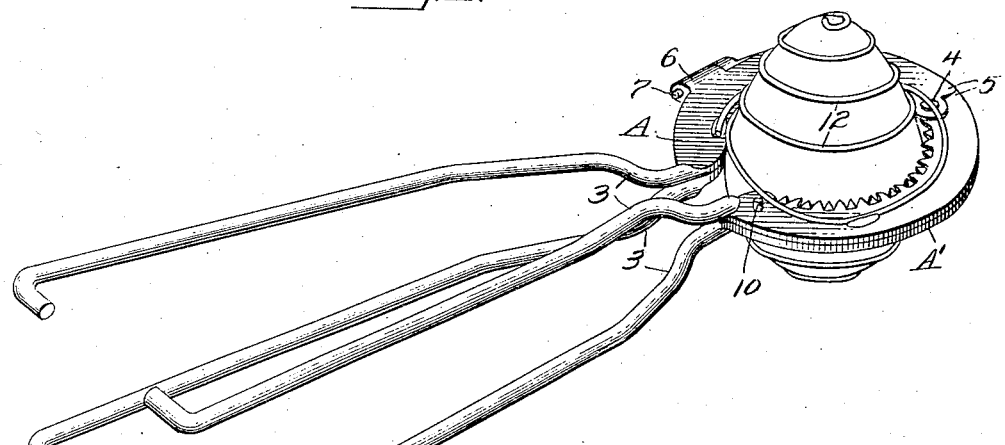
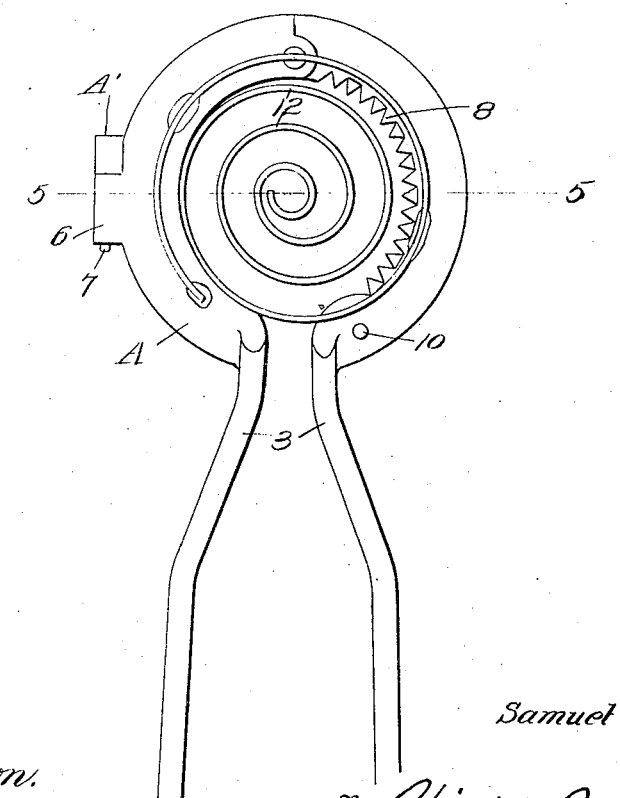
Witnesses
F. C. Gibson
Wm. Bagger
Inventor
Samuel M. Beel.
By Victor J. Evans
Attorney No. 894,106. PATENTED JULY 21, 1908.
S. M. BEEL.
EGG BREAKER.
APPLICATION FILED JULY 10, 1907.
2 SHEETS—SHEET 2.
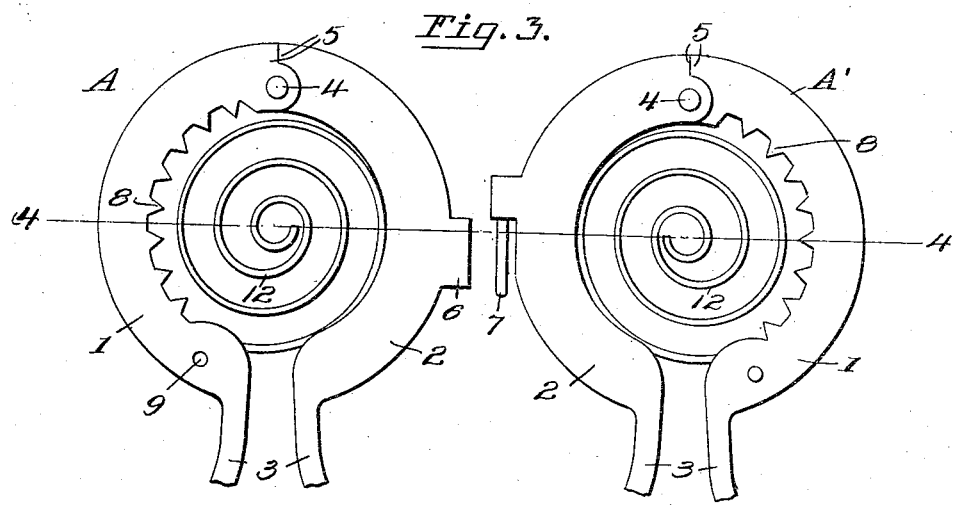
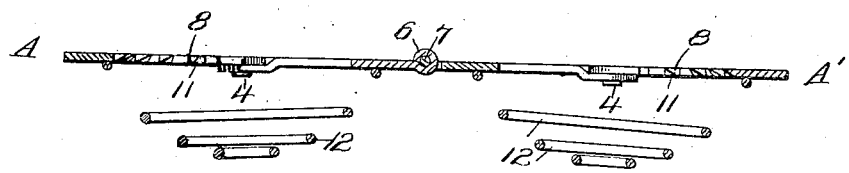
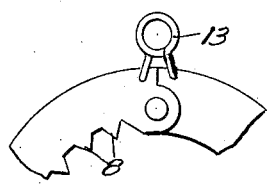
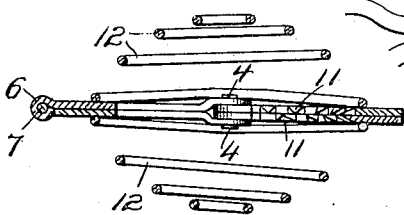
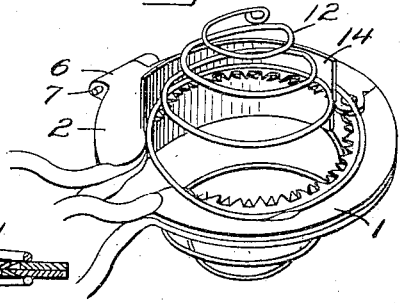
Witnesses
F. C. Gibson
Wm Bagger
Inventor
Samuel M. Beel.
By Victor J. Evans
Attorney

UNITED STATES PATENT OFFICE.

SAMUEL M. BEEL, OF SMUGGLER, COLORADO.

EGG-BREAKER.

No. 894,106.  Specification of Letters Patent.  Patented July 21, 1908.

Application filed July 10, 1907. Serial No. 383,100.

*To all whom it may concern:*

Be it known that I, SAMUEL M. BEEL, a citizen of Great Britain, residing at Smuggler, in the county of San Miguel and State of Colorado, have invented new and useful Improvements in Egg-Breakers, of which the following is a specification.

This invention relates to egg breakers, and it has for its objects to simplify and improve the construction and operation of this class of devices.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

In the drawing, Figure 1 is a perspective view of an egg breaker constructed in accordance with the invention. Fig. 2 is a top plan view of the same. Fig. 3 is a plan view showing the members of the egg breaker, separated, from each other, the handles having been broken away. Fig. 4 is a transverse sectional view taken through the heads of the members composing the egg breaker, said heads being shown in open or unfolded position, substantially as illustrated in Fig. 3, where the line 4—4 indicates the plane of said sectional view, the heads being however, hingedly connected. Fig. 5 is a transverse sectional view taken on the plane indicated by the line 5—5 in Fig. 2. Fig. 6 is a perspective detail view illustrating a modification. Fig. 7 is a detail plan view illustrating another modification.

Corresponding parts in the several figures are denoted by like characters of reference.

The improved egg beater is composed of two principal members which, in all essential particulars are of identical construction but which, for the purpose of distinguishing between them have been designated respectively A and A'.

Each of the members A and A' includes a head composed of two approximately semicircular jaws 1 and 2, said jaws being provided at what I shall designate as their forward ends with handles 3—3, and said jaws being hingedly connected adjacent to their rear ends or extremities by pivotal pins 4 adjacent to which shoulders 5 are formed upon the said jaws which, by abutting upon each other, will prevent the jaws from spreading or opening out beyond a predetermined point. The jaws 2—2 of the members A and A' are provided respectively with an apertured lug 6 and with a pin or pintle 7 adapted for engagement with said apertured lug, so that, by inserting said pintle in the apertured lug, the parts or members will be hingedly connected together, but in such a manner that they may be very readily disconnected or separated by simply disengaging the pintle 7 from the apertured lug 6. When the parts or members A and A' are hingedly connected, in the manner described, one of said members may be readily folded or closed upon the other, to the position indicated in Figs. 1 and 2, while, by properly manipulating the handles, the said members may be opened apart to the position illustrated in Fig. 4.

The semi-circular jaws 1—1 of the members A and A', respectively, are provided at their inner edges with spaced teeth 8—8; the teeth of the two jaws being disposed in staggering relation so that, when the members are folded together, the teeth of one jaw will occupy the spaces or intervals between the teeth of the other jaw, as will be clearly seen in Fig. 2; in order that this position may be properly attained, the jaw 1 of one of the members, A, is provided near its rear end with an aperture 9 for the reception of a guide pin 10 secured in a corresponding position upon the jaw 1 of the member A'. It will, moreover, be observed that the teeth of the two jaws are provided with flat engaging or meeting faces, while the opposite faces of said teeth are beveled, as will be best seen at 11 in Figs. 4 and 5.

For the purpose of holding or retaining in position the egg that is to be operated upon, each of the members, A and A' is provided with a retaining spring 12 of approximately conical shape; the base coils of said springs being secured exteriorly upon the jaws 1—2 of the members A and A' respectively in such a manner that by the tension of said base coils, the jaws 1—2 will be expanded or forced apart from each other. Should the inherent resiliency of the base coils of the springs be insufficient for this purpose, auxiliary springs, as shown at 13 in Fig. 6 of the drawings may be connected with the jaws. The springs 12—12 will jointly form a pocket in which an egg may be placed to be operated upon; and said springs will not only readily adapt themselves to eggs of various sizes, but, being open, they will permit the albumen or white of the egg to be readily discharged as the egg is broken and the parts of the shell separated.

While I regard it as sufficient for the purposes of the invention to form teeth upon the jaws 1—1 only, it may sometimes be found desirable to form teeth upon the jaws 2—2 also, such teeth having been shown in Fig. 7 where said teeth are designated 14. When this construction is adopted however it becomes necessary or desirable to provide the jaws 2—2 with guard flanges 15 formed at the bases of the teeth, and approximately at right angles to the latter for the purpose of obstructing the egg shell and causing the opposite side to be readily penetrated by the teeth formed upon the jaws 1—1; the latter jaws may if desired be provided with similar guard flanges.

In the practical operation of this invention, the members A and A' are opened apart to the position indicated in Fig. 4 and the egg is placed upon the supporting spring connecting the jaws 1—2 of the one section or member, and the members are then folded together to the position shown in Fig. 1, care being taken to insert the guide pin 10 into the aperture 9. Pressure is then exerted upon the handles 3—3 connected with the jaws 1—1 of the two members in the direction of the handles connected with the jaws 2—2 of the other member, thus causing the teeth of the jaws to penetrate the shell, the halves of which will now, by opening the members A and A' apart, be separated, causing a portion of the albumen to escape into a dish or receptacle above which the breaker is held. If it is desired to separate the yolk from the white, this may be readily accomplished by disconnecting the members A and A' which may be held by their respective handles in the hands of the operator who, by deftly passing the yolk to and fro between the halves of the shell may quickly effect the desired separation, after which the shells may be removed and the members reunited for a repetition of the operation.

Having thus fully described the invention, what is claimed as new is:—

1. In an egg breaker, two separably connected parts or members each comprising two approximately semicircular jaws hinged together and having handles at the free ends thereof and a conical egg receiving spring having its base coil secured upon said jaws and exerting its tension to force the jaws apart from each other.

2. An egg breaker comprising two hingedly connected members, each of said members including two approximately semi-circular jaws hingedly connected together, and an egg receiving device, the pivots of the said members being at right angles to those of the jaws and each of said jaws having a handle.

3. An egg breaker comprising two hingedly connected members, each of said members including two approximately semicircular jaws hingedly connected together, egg receiving springs secured to the jaws of each member, and a pin carried by one jaw of one member and adapted to enter an opening in one jaw of the other member when the members are folded together.

In testimony whereof, I affix my signature in presence of two witnesses.

SAMUEL M. BEEL.

Witnesses:
JOHN M. WARDLAW,
L. C. KINIKIN.